United States Patent [19]

Demilie

[11] 4,022,871

[45] May 10, 1977

[54] PROCESS FOR THE FABRICATION OF SODIUM BICARBONATE AND BORIC ACID FROM BOROSODIUM ORES

[75] Inventor: Paul Demilie, Brussels, Belgium

[73] Assignee: Solvay & Cie, Brussels, Belgium

[22] Filed: Dec. 10, 1975

[21] Appl. No.: 639,602

[30] Foreign Application Priority Data

Dec. 16, 1974 France .................... 74.41707

[52] U.S. Cl. .................. 423/283; 423/186; 423/279; 423/423
[51] Int. Cl.² ......................... C01B 35/12
[58] Field of Search .......... 423/279, 282, 283, 180, 423/423; 23/302

[56] References Cited

UNITED STATES PATENTS

| | | | |
|---|---|---|---|
| 1,510,046 | 9/1924 | Dolbear | 23/302 T X |
| 1,660,561 | 2/1928 | Lambert | 423/423 |
| 3,018,163 | 1/1962 | May et al. | 423/282 |
| 3,112,996 | 12/1963 | Garbato | 423/283 |

FOREIGN PATENTS OR APPLICATIONS

| | | | |
|---|---|---|---|
| 587,338 | 1/1959 | Italy | 423/297 |
| 861,416 | 2/1961 | United Kingdom | 23/302 |

*Primary Examiner*—G. O. Peters
*Attorney, Agent, or Firm*—Spencer & Kaye

[57] ABSTRACT

Process for the fabrication of boric acid by carboammoniac attack of a borate mineral, involving subjecting a borosodium ore, in its natural state or previously refined, and in a finely ground condition, to a treatment in an aqueous medium with carbonic anhydride and ammonia in a manner to precipitate sodium bicarbonate which is separated. The remaining mother liquor is cooled to obtain crystals of ammonium borate which are separated, redissolved, the obtained solution being decomposed by thermal means in order to form ammonia which is recycled to the ore treatment and a boric acid solution from which the acid is separated by crystallization. This process permits obtaining two valuable products: $NaHCO_3$ and $H_3BO_3$. When the ore is preliminarily refined, more effective utilization can be made of the ammonia.

12 Claims, 3 Drawing Figures

FIG 3

PROCESS FOR THE FABRICATION OF SODIUM BICARBONATE AND BORIC ACID FROM BOROSODIUM ORES

BACKGROUND OF THE INVENTION

The present invention is directed to a process for producing sodium bicarbonate and boric acid by carboammoniac attack of borosodium ores, or minerals, such as tincal, or borax.

In the processes for treatment of borate minerals, borocalcium minerals, for example colemanite ($2CaO.2B_2O_3.5H_2O$), are generally transformed into boric acid while the borosodium minerals such as tincal (borax) ($Na_2O.2B_2O_3.10H_2O$) and the borocalcosodium minerals such as boronatrocalcite (ulexite) ($Na_2O.2CaO.5B_2O_3.16H_2O$) are most often converted into borax or sodium borate in order to volorize their $Na_2O$ content (Bräuder u. d'Ans - Fortschritte in der anorganischem Chemie - 1877–1917 — (1922) — Vol. I — Part 2, page 2596).

Thus, in French Patent No. 1,256,827 of May 11th, 1960, filed by S.p.A. Larderello, there is described a process for producing boric acid by carboamoniac attack of clemanite or other borocalacium minerals. According to this patent, one begins, for example, with colemanite, which is ground, possibly calcined, then treated with a solution of ammonium bicarbonate and ammonia or carbonic anhydride and ammonia, while being agitated, for several hours, at a temperature between ambient temperature and 90° C to produce the reaction:

$$2CaO.3B_2O_3.5H_2O + 2 (NH_4)HCO_3 + 4NH_3 + 2H_2O \rightarrow 2CaCO_3 + 6(NH_4)H_2BO_3$$

the resulting suspension being filtered in order to separate the calcium carbonate, and the remaining solution of ammonium borates being brought to the boiling point in order to concentrate it and to eliminate the ammonia which is recycled:

$$(NH_4) H_2BO_3 \rightarrow H_3BO_3 + NH_3.$$

After a substantial concentration of the solution, it is cooled in order to crystallize the boric acid; the crystals are separated, washed and dried while the mother liquors return to the concentration circuit.

The borosodium minerals such as tincal (borax) and kernite ($Na_2O.2B_2O_3.4H_2O$) are normally treated by simple recrystallization to produce pure borax. If it is desired to finally obtain boric acid, the mineral of the pure borax is treated with an acid, for example sulphuric acid (Ullmann's Encyklopaedie der technischen Chemie — 3rd edition — 1953 — Vol. 4 — pages 587 and 591–593).

Applicant has discovered that it is worthwhile to apply to borosodium minerals not containing calcium, particularly to tincal, the carboammoniac attack proposed by Larderello S.p.A. for borocalcium minerals. Instead of precipitating calcium carbonate, one obtains sodium bicarbonate which can be separated and converted into sodium carbonate by calcination, while yielding at the same time a rich carbonic anhydride usable for the carboammoniac attack.

SUMMARY OF THE INVENTION

Thus, the present invention relates to a process for fabricating boric acid by carboammoniac attack of a borate mineral, the process according to the invention involving treating a finely ground borosodium mineral in an aqueous medium with carbonic anhydride and ammonia in a manner to precipitate sodium bicarbonate which is separated, the remaining mother liquor being cooled in order to obtain crystals of an ammonium borate which are separated, redissolved and the obtained solution decomposed by thermal means in order to form ammonia which is recycled to the mineral treatment and a boric acid solution, with the acid being separated by crystallization. The mother liquor of the crystallization of the ammonium borate can be recycled for the dissolution of the mineral. The mother liquor of the crystalllization of the boric acid can be used for redissolving the crystals of ammonium borate.

According to a preferred embodiment of the invention, the carboammoniac attack is not effectuated on a solution of raw borosodium mineral, but rather on pure hydrated sodium biborate, for example $Na_2O.2B_2O_3.5H_2O$, obtained by recrystallization from a mineral solution.

DESCRIPTION OF THE PREFERRED EMBODIMENTS

The process according to the present invention essentially involves a fabrication technique which approaches that employed to produce sodium carbonate from sodium chloride in a ammonia-soda plant, but in which the sodium chloride is replaced by borosodium mineral or sodium borate. Thus, in the case of the use of tincal as the starting material, roughly the following reactions will occur:

$$Na_2B_4O_7.10H_2O + 2NH_4HCO_3 \rightarrow (NH_4)_2B_4O_7 + 2NaHCO_3 + 10H_2O$$
$$2NaHCO_3 \rightarrow Na_2CO_3 + CO_2 + H_2O$$
$$(NH_4)_2B_4O_7 \rightarrow 4H_3BO_3 + 2NH_3$$
$$2NH_3 + 2CO_2 + 2H_2O \rightarrow 2 (NH_4)HCO_3$$

With respect to the classic soda-works, this process presents the advantage of avoiding the formation of residual calcium products and, moreover, reduces pollution, while yielding boric acid which consititutes a product of considerable commercial value.

This process is also of value with respect to that described in French Patent No. 1,256,827 of Larderello, because it produces sodium carbonate instead of calcium carbonate.

For practical embodiments of the invention, several examples of which will be given below, one can utilize apparatus of the same type as those utilized in standard soda-works, in particular absorbers for the formation of carboammoniac solutions using recovered ammonia and carbonic anhydride, and a carbonation column refrigerated at its lower part for precipitating the sodium bicarbonate.

The portion of the installation employed for recovering the ammonia and forming the boric acid will be more simple, since in the present procedure it is not necessary to utilize lime due to the fact that the ammonium borates are of much greater thermal instability than ammonium chloride and it is sufficient to heat them, for example by means of a vapor applied by indirect contact or direct contact, in order to decompose them into boric acid, water and ammonia.

In the classic ammonia-soda plant, the solubility of sodium chloride is very high and almost independent of temperature. The dissolution of the sodium chloride can be effectuated at cold temperatures, before and possibly after the crystallization of the sodium bicarbonate.

The borosodium minerals such as tincal, on the other hand, are very insoluble at cold temperatures, above all when in the presence of ammonium borate.

In order to crystallize ammonium borate, it is necessary to effectuate the operations in the following order:
  addition of borosodium mineral
  crystallization of sodium bicarbonate
  crystallization of ammonium borate.

In order for the efficiency of the cycle to be high, it is necessary that a substantial amount of borosodium mineral be added, but its dissolution may possibly be incomplete before the introduction of the solution to the bicarbonation column. In effect, during the crystallization of sodium bicarbonate, the weight ratio $Na_2O/B_2O_3$ in solution decreases, the solution becomes impoverished in $Na_2O$ and the solubility of the borosodium mineral increases; this latter then dissolves completely.

In addition to a high $B_2O_3$ content, the mother liquors of crystallization of the sodium bicarbonate should contain a maximum of ammonia in order to reduce the partial pressure of carbonic anhydride.

The sodium bicarbonate crystallization conditions conforming to these requirements have been determined.

At fixed temperature, the mother liquors of sodium bicarbonate crystallization can be saturated in four solid phases: $NaHCO_3$, $NH_4HCO_3$, $(NH_4)_2O.2B_2O_3.4H_2O$ and $(NH_4)_2O.4B_2O_3.6H_2O$. In effect, in the system $Na_2O - (NH_4)_2O - B_2O_3 - co_2 - H_2O$ there are five independent components. In the presence of four solid phases, one liquid phase and one vapor phase, the variance of the system is: $V = 5-6 + 2 = 1$.

It thus results that if the temperature is fixed, the pressure as well as the compositions of the liquid and gaseous phases are determined. It therefore remains to select a temperature at which the solubilities will be sufficiently high without the pressure exceeding 1 to 2 kg/cm², which values are achieved in standard soda-plants.

Solubility tests performed in selecting a temperature of 30° C have shown that at this temperature the content of $B_2O_3$ in the saturated solution in the four above-cited solid phases is low (126 g/kg) and the $Na_2O$ content is high (29 g/kg). The yield of a cycle based on the crystallization of $NaHCO_3$ at 30° C is mediocre, but the effective pressure is only 0.3 kg/cm².

The yield is improved by effecting the crystallization at 50° C; in the presence of the same solid phases, the effective pressure rises to 1.2 kg/cm² but the results are more advantageous:
  content of $B_2O_3$: 167 g/kg
  content of $Na_2O$: 27 g/kg Table 1 below provides the complete results for these two tests:

TABLE 1

| Solid Phases | Temp. °C | Saturated Solution, g/kg | | | | | | Effective Pressure kg/cm² |
| --- | --- | --- | --- | --- | --- | --- | --- | --- |
| | | $Na_2O$ | $(NH_4)_2O$ | $B_2O_3$ | $CO_2$ | $Na_2O$ bound to ($B_2O_3$) | $(NH_4)_2O$ bound to ($B_2O_3$) | |
| $NaHCO_3$<br>$NH_4HCO_3$<br>$(NH_4)_2O.2B_2O_3.4H_2O$<br>$(NH_4)_2O.4B_2O_3.6H_2O$ | 30 | 29 | 90 | 126 | 111 | 58 | 49 | 0.3 |
| | 50 | 27 | 135 | 167 | 145 | 87 | 73 | 1.2 |

From the mother liquors of the crystallization of sodium bicarbonate, one can crystallize different ammonium borates:
  $(NH_4)_2O.5B_2O_3.8H_2O$ : ammonium pentaborate
  $(NH_4)_2O.2B_2O_3.4H_2O$ : ammonium biborate
  $(NH_4)_2O/4B_2O_3.6H_2O$ : ammonium tetraborate.

The precipitation of ammonium pentaborate implies modifying the composition of the $NaHCO_3$ mother liquors by a partial stripping of ammonia. It has been observed that the presence of $CO_2$ in the form of $NaHCO_3$ is favorable. By cooling to 15° C a solution containing
  $Na_2O$, g/kg : 27
  $(NH_4)_2O$, g/kg : 26
  $B_2O_3$, g/kg : 170
while injecting $CO_2$, it results that ammonium pentaborate is crystallized and the mother liquors have the following composition:
  $Na_2O$, g/kg : 31
  $(NH_4)_2O$, g/kg : 16
  $B_2O_3$, g/kg : 110

The precipitation of the ammonium biborate occurs more favorably. The mother liquors of crystallization of sodium bicarbonate are found in the domain of crystallization of ammonium biborate. By subjecting these mother liquors to a simple pressure reduction followed by a cooling to 26° C, it is possible to crystallize ammonium biborate under particularly advantageous conditions since the mother liquors contain:
  $Na_2O$, g/kg : 49
  $(NH_4)_2O$, g/kg : 95
  $B_2O_3$ g/kg : 58.

The crystals recovered have a composition close to the theoretical composition of ammonium biborate. Moreover, it has been noted that the addition of $NH_4OH$ to the mother liquors of crystallization of sodium bicarbonate permits a substantial increase in the quantity of ammonium biborate crystallized; the results of test appear in Table 2 belows:

TABLE 2

| | Composition of the $NH_4$ biborate crystallization mother liquors | | |
| --- | --- | --- | --- |
| Temperature, °C | $(NH_4)_2O$ added g/kg | $(NH_4)_2O$ total g/kg | $B_2O_3$ g/kg |
| 28 | 0 | 94 | 85 |
| 27 | 20 | 114 | 57 |
| 28 | 40 | 132 | 45 |

In order to practice the process on an industrial scale, several variations can be imagined. There will be given below examples concerning the use of tincal in the framework of:

1. the crystallization of $NaHCO_3$ and of ammonium pentaborate at 30° C
2. the crystallization of $NaHCO_3$ and of ammonium pentaborate at 50° C
3. the crystallization of $NaHCO_3$ and of ammonium biborate at 50° C with elimination of the impurities of the tincal in the cycle
4. the crystallization of $NaHCO_3$ and of ammonium biborate at 50° C utilizing purified tincal.

Examples 3 and 4 represent preferred embodiments of the invention.

According to example 3, finely ground tincal is introduced into an aqueous medium, the mixture passing into a washer-decanter than into an absorber where it comes into contact with ammonia and carbonic anhydride recovered from a subsequent stage, the carboammoniacal solution of tincal thus obtained being introduced into a carbonation column where it is subjected to the action of a gas rich in carbonic anhydride in a manner to precipitate sodium bicarbonate. The sodium bicarbonate is separated, the remaining mother liquor being cooled in order to crystallize ammonium biborate. The ammonium biborate is separated, redissolved and the obtained solution decomposed by thermal action in order to form ammonia which is recycled to the absorber and a solution of boric acid from which the acid is separated by crystallization. The mother liquor of the separation of the acid is recycled in order to redissolve the crystals of ammonium biborate and the mother liquor of the separation of the ammonium biborate is evaporated in order to recover ammonia and carbonic anhydride. The latter are delivered to the absorber while the remaining solution is utilized for dissolving the mineral. The lower part of the carbonization column is maintained at about 50° C.

According to example 4, use is not made of tincal in its naturally occurring state, but rather pure hydrated sodium borate crystals obtained by recrystallization from a tincal solution, the mother liquor of this crystallization being reused for the dissolution of the mineral. The crystals of hydrated sodium borate thus obtained are introduced into a carbonation column which also receives a caroammoniacal solution recovered in a subsequent stage and a gas rich in carbonic anhydride in a manner to precipitate sodium bicarbonate, the mother liquor remaining after the separation of the sodium bicarbonate is enriched with recovered ammonia and is then cooled in order to crystallize ammonium biborate which is separated, redissolved and the obtained solution decomposed by thermal means in order to form a solution of boric acid, from which the acid is separated by crystallization, and of ammonia. One part of the latter is recycled in order to enrich, with respect to ammonia, the mother liquor from the separation of sodium bicarbonate and the other part is delivered to an absorber which also receives the mother liquor from the crystallization of the ammonium biborate, the carboammoniacal solution thus formed in this absorber being delivered to the carbonation column. The lower part of the carbonation column is maintained at about 50° C.

If the preliminary refinement of the tincal is carried out in a manner to crystallize the pentahydrated sodium biborate, there is no water which would have to be evaporated during the cycle.

EXAMPLE 1 : Crystallization of $NaHCO_3$ and of ammonium pentaborate at 30° C One starts with finely ground tincal ($Na_2O.2B_2O_3.10-H_2O$), which is not purified, or refined, and this material is treated in an installation having the form illustrated schematically in FIG. 1. The finely ground tincal is introduced into a reservoir 1 where it is mixed with mother liquor coming from a centrifuge 8 in which ammonium pentaborate is separated. The mixture passes from reservoir 1 to a decanter-washer 2 into which is introduced washing water and from which the slurry or sediment is withdrawn. The supernatent mineral suspension then passes into a chiller-absorber 3 where it comes into contact with a mixture of carbonic anhydride and ammonia derived from stripping installations 6 and 10 provided for this purpose. The ammoniacal liquor formed in unit 3 passes into carbonation column 4 which is also supplied with the rich carbonic anhydride and which is cooled in its lower portion in order to bring the temperature thereat to 30° C. The pressure established is effectively 2.9 kg/cm². The aqueous suspension of sodium bicarbonate is filtered in a filter 5, the $NaHCO_3$ being able to, as in a standard soda-works, be converted into sodium carbonate, which yields $CO_2$ that can be utilized in bicarbonation column 4. The filtrate, which consists of an aqueous solution containing sodium bicarbonate, sodium borate, ammonium bicarbonate and above all ammonium borate, is subjected to a vapor stripping action by indirect contact in stripper 6 from which there is collected a mixture of ammonia and carbonic anhydride which is delivered to the absorber 3. The remaining solution is cooled to 15° C in a cooler 7 into which carbonic anhydride is injected, in order to provoke a crystallization of ammonium pentaborate whose crystals are separated from the mother liquor in the centrifuge 8, the remaining mother liquor being conveyed to the reservoir 1 in which the tincal being introduced is dissolved, while the crystals are redissolved in a dissolver 9 by means of water and mother liquor coming from the boric acid centrifuge 12. The ammonium pentaborate solution formed in dissolver 9 is subjected to a direct contact vapor stripping in stripper 10 in order to decompose it into ammonia and a boric acid solution, the ammonia being conveyed to the absorber 3. The boric acid solution is crystallized in a crystallizer 11, the crystals are separated from the mother liquor in the centrifuge 12 and then more thoroughly dried in a dryer 13 while the mother liquor coming from centrifuge 12 is redelivered to dissolver 9.

Table 3 below sets forth the flow rates of the various components and the compositions of the products at the various locations in the processing system, the flow rates being those which correspond to one ton of solution at the outlet of filter 5. The location numerals appearing in the column headings designate locations bearing the same reference numerals in FIG. 1.

It is noted that the efficiency of the cycle is mediocre and that it is necessary to desorb and then reabsorb large quantities of ammonia.

EXAMPLE 2: Crystallization of $NaHCO_3$ and of ammonium pentaborate at 50° C

In order to increase the yield of the cycle, the same process is carried out but in adjusting the temperature at the bottom of the carbonation column 4 of FIG. 1 to 50° C. The necessary effective pressure is 1.0 kg/cm². The installation utilized is identical to that of Example 1 and is thus also shown in FIG. 1.

Table 4 below sets forth the flow rates of the various components and the compositions of the products at the various locations in the installation, the flow rates being with respect to one ton of solution at the outlet of filter 5. The location numerals appearing in the Table correspond to the reference numerals appearing in FIG. 1.

TABLE 3
(FIG. 1)

| Location | Reservoir 1 | | Absorber 3 | | Carbonation Column 4 | | | | Stripper 6 | | | Crystallizer 7 | | | Ammonium pentaborate decomposition in 9-13 | | | |
|---|---|---|---|---|---|---|---|---|---|---|---|---|---|---|---|---|---|---|
| Ingredient | Tincal Input | Mother Liquor Recycled from Centrifuge 8 | Tincal Solution Input | Input of Recycled $NH_3$ and $CO_2$ | Carbo-ammoniacal Solution Input | $NaHCO_3$ Output | $CO_2$ Input | Input | $NH_3$ and $CO_2$ Output | Vapor Output | Input | Input | $CO_2$ Injection | Input | $NH_3$ Recovery | Heating Vapor | Boric Acid |
| Flow rates, kg/t column solution output | | | | | | | | | | | | | | | | | | |
| $Na_2O$ | 12 | 25 | 37 | — | 37 | 12 | — | 25 | — | — | 25 | — | — | — | — | — |
| $(NH_4)_2O$ | — | 13 | 13 | 65 | 78 | — | — | 78 | 61 | — | 17 | — | 4 | 4 | — | — |
| $B_2O_3$ | 26 | 89 | 115 | — | 115 | 17 | — | 115 | — | — | 115 | — | 26 | — | — | 26 |
| $CO_2$ | — | 10 | 10 | 105 | 115 | 4 | 7 | 105 | 105 | — | — | 10 | — | — | — | — |
| $H_2O$ | 33 | 648 | 681 | — | 681 | — | — | 677 | — | 18 | 659 | — | 11 | — | 9 | 20 |
| Total | 71 | 785 | 856 | 170 | 1026 | 33 | 7 | 1000 | 166 | 18 | 816 | 10 | 41 | 4 | 9 | 46 |
| Compositions, g/kg | | | | | | | | | | | | | | | | | | |
| $Na_2O$ | 162 | 32 | 43 | — | 36 | 369 | — | 25 | — | — | 31 | — | — | — | — | — |
| $(NH_4)_2O$ | — | 17 | 15 | 382 | 76 | — | — | 78 | 367 | — | 21 | — | 96 | 1000 | — | — |
| $B_2O_3$ | 365 | 113 | 134 | — | 112 | — | — | 115 | — | — | 141 | — | 639 | — | — | 563 |
| $CO_2$ | — | 13 | 12 | 618 | 112 | 524 | 1000 | 105 | 633 | — | — | 1000 | — | — | — | — |
| $H_2O$ | 473 | 825 | 796 | — | 664 | 107 | — | 677 | — | 1000 | 807 | — | 265 | — | 1000 | 437 |

TABLE 4
(FIG. 1)

| Location | Reservoir 1 | | Absorber 3 | | Carbonation Column 4 | | | | Stripper 6 | | Crystallizer 7 | | Ammonium pentaborate decomposition in 9-13 | | | |
|---|---|---|---|---|---|---|---|---|---|---|---|---|---|---|---|---|
| Ingredient | Tincal Input | Mother Liquor Recycled from Centrifuge 8 | Tincal Solution Input | Input of Recycled NH$_3$ ammoniacal and CO$_2$ | Carbo- ammoniacal Solution Input | NaHCO$_3$ Output | CO$_2$ Input | Input | NH$_3$ and CO$_2$ Output | Vapor Output | Input | CO$_2$ Injection | Input | NH$_3$ Recovery | Heating Vapor | Boric Acid |
| Flow rates, kg/t column solution output | | | | | | | | | | | | | | | | |
| Na$_2$O | 33 | — | 60 | — | 60 | 33 | — | 27 | — | — | 27 | — | — | — | — | — |
| (NH$_4$)$_2$O | — | 27 | 14 | 121 | 135 | — | — | 135 | 110 | — | 25 | — | 11 | 11 | — | — |
| B$_2$O$_3$ | 74 | 14 | 170 | — | 170 | — | — | 170 | — | — | 170 | — | 74 | — | — | 74 |
| CO$_2$ | — | 96 | 38 | 150 | 188 | 47 | 9 | 150 | 150 | — | — | 38 | — | — | — | — |
| H$_2$O | — | 38 | 527 | — | 527 | 9 | — | 518 | — | 56 | 462 | — | 31 | — | 26 | 57 |
| Total | 203 | 431 | 809 | 271 | 1080 | 89 | 9 | 1000 | 260 | 56 | 684 | 38 | 116 | 11 | 26 | 131 |
| Compositions, g/kg | | | | | | | | | | | | | | | | |
| Na$_2$O | 162 | 45 | 7 | — | 56 | 369 | — | 27 | — | — | 39 | — | — | — | — | — |
| (NH$_4$)$_2$O | — | 23 | 17 | 446 | 125 | — | — | 135 | 423 | — | 37 | — | 96 | 1000 | — | — |
| B$_2$O$_3$ | 365 | 158 | 210 | — | 157 | — | — | 170 | — | — | 249 | — | 639 | — | — | 563 |
| CO$_2$ | — | 63 | 47 | 534 | 174 | 524 | 1000 | 150 | 577 | — | — | 1000 | — | — | — | — |
| H$_2$O | — | 711 | 652 | — | 488 | 107 | — | 518 | — | 1000 | 675 | — | 265 | — | 1000 | 437 |
| Total | 473 | | | | | | | | | | | | | | | |

The results of Example 2 are more favorable than those of Example 1. The yields of the cycle increase, but it remains necessary to desorb and then reabsorb large quantities of ammonia.

EXAMPLE 3: Crystallization of NaHCO$_3$ and of ammonium biborate at 50° C

Instead of crystallizing ammonium pentaborate, it is possible to crystallize ammonium biborate. It has been seen that the treatment conditions are then more favorable because the mother liquors of the crystallization of sodium bicarbonate are within the domain of crystallization of ammonium biborate. This example has been carried out by adjusting the temperature at the bottom of the carbonation column to 50° C; the necessary effective pressure is 1 kg/cm$^2$.

Figure 1:
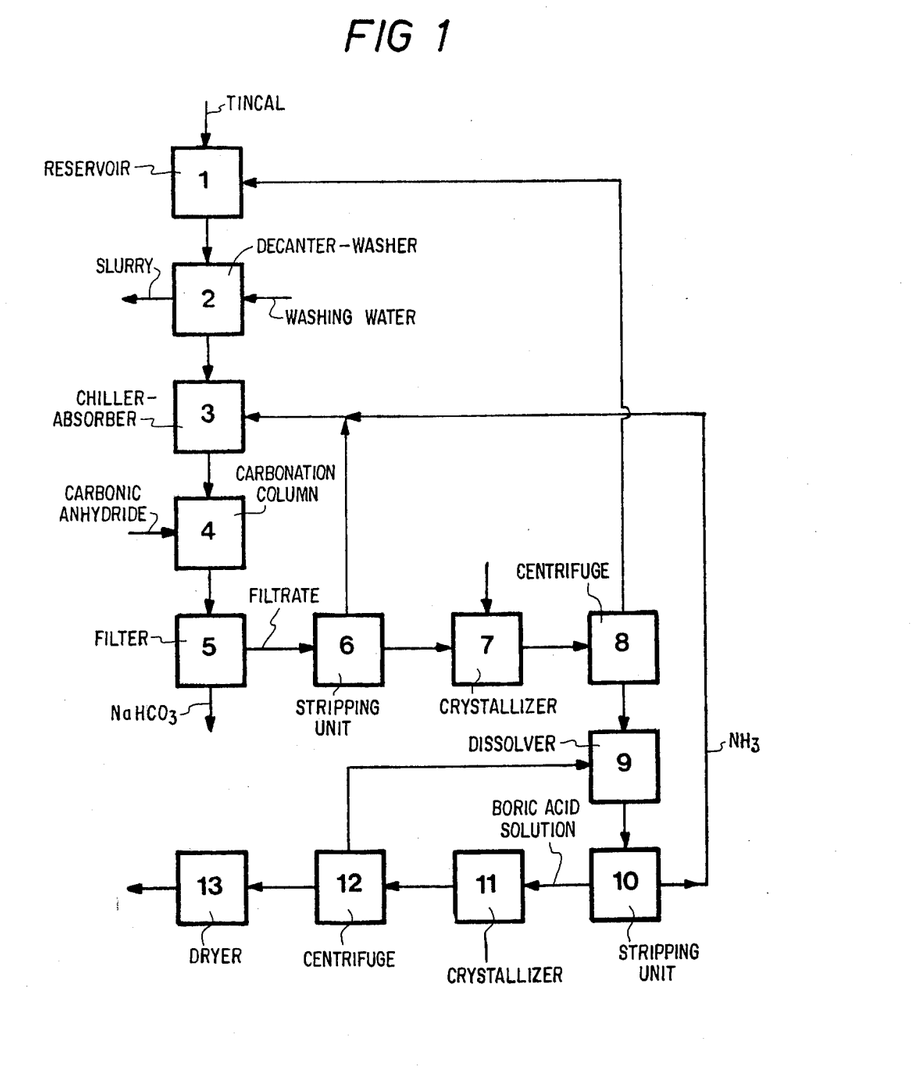
FIGS. 1–3 are schematic diagrams of various embodiments of installations which can be used for the practice of the present invention.
Figure 2:
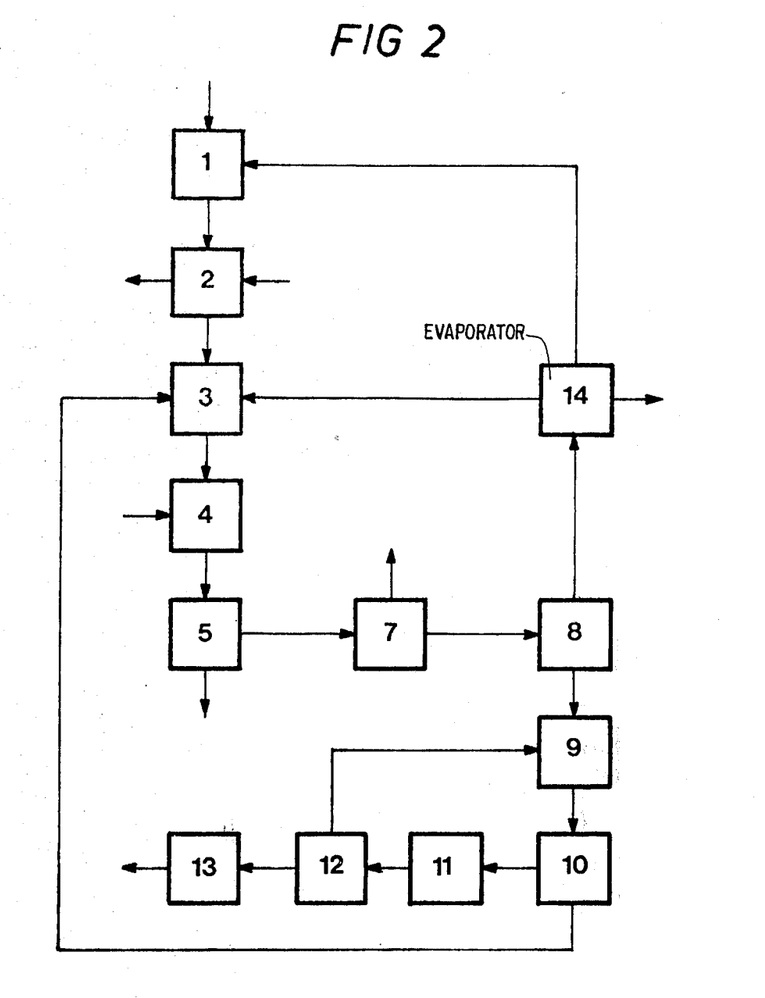

The entirety of the apparatus utilized is shown in FIG. 2 where the individual units are given the same reference numerals as in FIG. 1 if they are also present in the apparatus of FIG. 1.

The soda part remains practically unchanged. The ground tincal is introduced into the reservoir 1 where it is mixed with mother liquor coming from an evaporator 14. The mixture passes to the decanter-washer 2 then to the absorber 3 where it comes in contact with ammonia and carbonic anhydride coming from the tube-type evaporator 14 and the stripping unit 10. The ammoniacal liquor formed passes to the carbonation column 4 supplied with rich carbonic anhydride and cooled in its lower portion to bring the temperature thereat to 50° C, the effective pressure being approximately equal to 1 kg/cm$^2$. The sodium bicarbonate suspension is filtered in filter 5, NaHCO$_3$ being separated and the mother liquor delivered, no longer to a stripping zone, but directly to the cooler or crystallizer 7 operating at 26° C, where the carbonic anhydride is liberated while forming crystals of ammonium biborate which are separated in centrifuge 8. The treatment of the crystals is performed, as in Example 1, dissolver 9, stripping unit 10, boric acid crystallizer 11, centrifuge 12 and dryer 13. On the other hand, the mother liquors of the crystallization of ammonium biborate pass into the evaporator 14 from which there is recovered NH$_3$ and CO$_2$ which are delivered into the absorber 3, the mother liquors going into the reservoir 1 where further quantities of tincal are dissolved.

Table 5 below gives the flow rates of the various components and the compositions of the products at various stages of the fabrication process, the flow rates being with respect to the one ton of solution at the outlet of filter 5. The numerals represent locations and correspond to the reference numerals appearing in FIG. 2.

TABLE 5 (FIG. 2)

| Location | Evaporator 14 | | | Reservoir 1 | | Absorber 3 | | | Carbonation Column 4 | | | Crystallizer 7 | Ammonium biborate decomposition in 9-13 | | |
|---|---|---|---|---|---|---|---|---|---|---|---|---|---|---|---|
| Ingredient | Liquor Input | Vapor Output | Gas Output | Mother liquor from evaporator 14 | Tincal Input | Tincal solution input | Input of gas from evaporator 14 | Input of gas from stripper 10 | Carbo-ammoniated Tincal Solution Input | CO₂ Input | NaHCO₃ Output | Input | Input | Heating vapor | Boric acid |
| Flow rates, kg/t column solution output | | | | | | | | | | | | | | | |
| Na₂O | 27 | — | — | — | 27 | 83 | — | — | 83 | — | — | 27 | — | — | — |
| (NH₄)₂O | 88 | — | 88 | 56 | — | — | 88 | 47 | 135 | — | — | 135 | 47 | — | 126 |
| B₂O₃ | 44 | — | — | — | 44 | 170 | — | — | 170 | — | 80 | 170 | 126 | — | 98 |
| CO₂ | 150 | — | 150 | 126 | — | — | 150 | — | 150 | 80 | 16 | 150 | 65 | 33 | — |
| H₂O | 453 | 82 | — | 163 | 371 | 534 | — | — | 534 | — | 56 | 518 | — | — | — |
| Total | 762 | 82 | 238 | 345 | 442 | 787 | 238 | 47 | 1072 | 80 | 152 | 1000 | 238 | 33 | 224 |
| Compositions, g/kg | | | | | | | | | | | | | | | |
| Na₂O | 35 | — | — | — | 61 | 105 | — | — | 77 | — | 369 | 27 | — | — | — |
| (NH₄)₂O | 115 | — | 370 | 162 | — | — | 370 | 1000 | 126 | — | — | 135 | 198 | — | 563 |
| B₂O₃ | 58 | — | — | — | 100 | 216 | — | — | 159 | — | 524 | 170 | 528 | — | 437 |
| CO₂ | 197 | — | 630 | 365 | — | — | 630 | — | 140 | 1000 | 107 | 150 | — | — | — |
| H₂O | 595 | 1000 | — | 473 | 839 | 679 | — | — | 498 | — | — | 518 | 274 | 1000 | — |

In this example, the yield of the cycle is increased. The complete dissolution of the tincal before start of crystallization of sodium bicarbonate is only necessary if the mineral is impure. The dissolving of the tincal requires a temperature close to 100° C and the totality of the ammonia will be desorbed. In order to reabsorb the ammonia, it is necessary to cool the solution and this leads to the crystallization of $Na_2B_4O_7 \cdot 10H_2O$ and of $Na_2B_4O_7 \cdot 5H_2O$. These crystals only disappear in proportion with the appearance of sodium bicarbonate.

EXAMPLE 4: Crystallization of $NaHCO_3$ and of ammonium biborate starting from purified tincal One can avoid the desorption of ammonia by utilizing purified tincal as the starting material. The present example gives the results obtained in a process providing for the preliminary purification of the tincal by crystallization of hydrated sodium borate. If the purification of the tincal is carried out in a manner to crystallize the pentahydrated sodium borate, there is no water to evaporate in the cycle since the total reaction is then:

$$Na_2B_4O \cdot 5H_2O + 2(NH_4)_2O + 2CO_2 \rightarrow (NH_4)_2B_4O_7 \cdot 4H_2O + 2NaHCO_3.$$

It is not necessary to assure the complete dissolution of the pure borax, because a dissolution will be produced in proportion with the appearance of crystals of sodium bicarbonate in the carbonation column.

Figure 3:
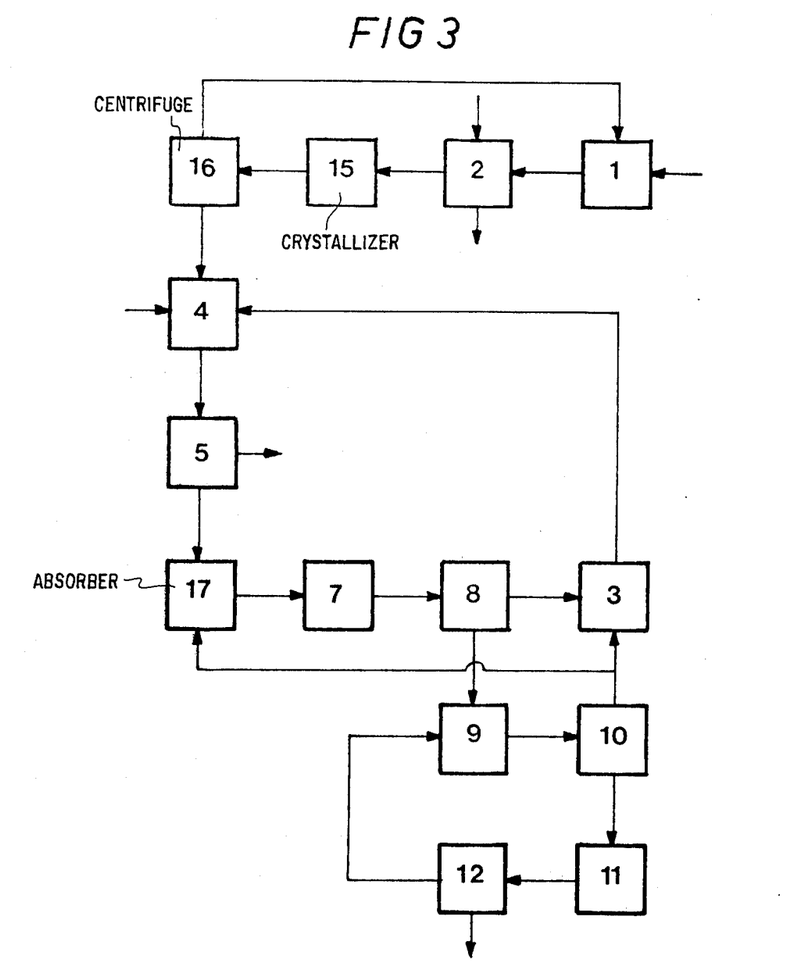

One installation suitable for carrying out such a process constituting an embodiment of the invention is shown in FIG. 3 where the units represented in FIGS. 1 and 2 are given the same reference numerals.

The finely ground raw tincal passes to the dissolver 1, to the decanter-washer 2, then into a crystallizer 15 and into a centrifuge 16, after which it is introduced into the carbonation column 4 together with rich $CO_2$ and the ammonia recovered in the absorber 3 from the mother liquor coming from the centrigue 8 for the ammonium biborate crystals and from the stripping of the solution of crystals of $(NH_4)_2O \cdot 2B_2O_3 \cdot 4H_2O$ in stripping unit 10. The temperature of crystallization of the sodium bicarbonate is 50° C. The sodium bicarbonate filter 5 separates the solid $NAHCO_3$ and leaves a mother liquor which passes to an absorber 17 where it receives part of the ammonia recovered in stripping unit 10. This mother liquor, thus enriched in ammonia, passes to the crystallizer 7 operating at 26° C and to the centrifuge 8 where crystals of ammonium biborate are separated, the mother liquor being conveyed to the absorber 3 as indicated above.

These crystals are redissolved in dissolver 9 in the mother liquor from the boric acid centrifuge 12, then the solution passes to the stripping unit 10 shich liberatesthe ammonia supplied to the absorber 3 and a boric acid solution, the latter finally being subjected to crystallization in crystallizer 11 and a centrifuging in centrifuge 12. The centrifuged crystals are further dried as in the previous examples.

Table 6 below gives the flow rates of the various components and the compositions of the products at the various stages of the fabrication process, the rates being with respect to 1 ton of solution at the outlet of filter 5. The numerals appearing in the table correspond to the reference numerals in FIG. 3.

TABLE 6
(FIG. 3)

| Location | Absorber 3 | | Carbonation Column 4 | | | Filter 5 | | | Absorber 17 | | Crystal-lizer 7 | Centri-fuge 8 | | Decomposition of the NH₄ biborate 9 to 12 | | |
|---|---|---|---|---|---|---|---|---|---|---|---|---|---|---|---|---|
| Ingredient | NH₃ from Stripper 10 | Mother liquor from centri-fuge 8 | Solution Input from Ab-sorber 3 | Sodium borate 5H₂O Input | CO₂ Input column 4 | Liquid Input from column 4 | NaHCO₃ Output | Liquid Input from filter 5 | NH₃ from Stripper 10 | Liquid Input from Absorber 17 | Liquid Output | Crystals from centri-fuge 8 | Vapor Input | NH₃ from Stripper 10 | Boric Acid |
| Flow rates, kg/t column solution output | | | | | | | | | | | | | | | | |
| Na₂O | — | 35 | 35 | 50 | — | 85 | 50 | 35 | — | 35 | 35 | — | — | — | — |
| (NH₄)₂O | 22 | 101 | 123 | — | — | 123 | — | 123 | 20 | 143 | 101 | 42 | — | 42 | — |
| B₂O₃ | — | 46 | 46 | 113 | — | 159 | — | 159 | — | 159 | 46 | 113 | — | — | 113 |
| CO₂ | — | 140 | 140 | — | 71 | 211 | 71 | 140 | — | 140 | 140 | — | — | — | — |
| H₂O | — | 484 | 484 | 73 | — | 557 | 14 | 543 | — | 543 | 484 | 59 | 36 | — | 88 |
| Total | 22 | 806 | 828 | 236 | 71 | 1135 | 135 | 1000 | 20 | 1020 | 806 | 214 | 36 | 42 | 201 |
| Compositions, g/kg | | | | | | | | | | | | | | | | |
| Na₂O | — | 43 | 42 | 213 | — | 75 | 369 | 35 | — | 34 | 43 | — | — | — | — |
| (NH₄)₂O | 1000 | 125 | 149 | — | — | 108 | — | 123 | 1000 | 140 | 125 | 198 | — | 1000 | — |
| B₂O₃ | — | 57 | 56 | 478 | — | 140 | — | 159 | — | 156 | 57 | 528 | — | — | 563 |
| CO₂ | — | 174 | 169 | — | 1000 | 186 | 524 | 140 | — | 137 | 174 | — | — | — | — |
| H₂O | — | 601 | 584 | 309 | — | 491 | 107 | 543 | — | 533 | 601 | 274 | 1000 | — | 437 |

Of the four cycles described above, the fourth is of greatest interest. It permits achieving a good yield, or efficiency, while avoiding the description of the ammonia and the necessity of reabsorbing it. This preferred cycle implies a preliminary purification of the tincal by crystallization and the crystallization of the sodium bicarbonate in the presence of solid tincal.

The present invention is not limited to the specific examples given herein by way of illustration. It can in particular be adapted to the treatment of borosodium minerals other than tincal, for example kernite. Moreover, it encompasses the modifications directly suggested to one skilled in the art and the use of techniques known as being equivalent to those specified herein.

What is claimed is:

1. In a process for producing boric acid by carboammoniac attack of a borate mineral, the improvement wherein the process is performed on borosodim mineral in finely ground form and the process comprises the steps of:
   1. treating the finely ground mineral in an aqueous sodium bicarbonate;
   2. separating the sodium bicarbonate precipitated during said treating step from the mother liquor produced therein
   3. cooling such mother liquor in order to obtain crystals of an ammonium borate;
   4. separating such crystals from the remaining mother liquor;
   5. redissolving the separated crystals of step (4) to obtain an ammonium solution;
   6. applying heat to the obtained solution of step (5) in order to decompose the ammonium borate to form ammonia an a boric acid solution;
   7. separating the acid from such boric acid solution by crystallization; and
   8. conveying the ammonia formed during said heat applying step (6) to serve as at least part of the ammonia treating the mineral in said treating step (1).

2. Process as defined in claim 1 further comprising using the mother liquor produced in said cooling step (3) after separation of the ammonium borate crystals in step (4) for treating the mineral during said treating step (1).

3. Process as defined in claim 1 further comprising using the mother liquor produced in said step (7) of separating the acid to dissolve the ammonium borate crystals during said redissolving step (5).

4. Process as defined in claim 1 wherein said step of treating is carried out in a plate column and includes: causing the mineral in solution to descend through the column together with ammonia and carbonic anhydride produced in a subsequent process step; supplying the column with a gas rich in carbonic anhydride, and cooling the lower part of the column.

5. Process as defined in claim 4 wherein said step of cooling the lower part of the column is carried out to maintain the temperature at the lower part of the column at about 50° C.

6. Process as defined in claim 1 wherein the borosodium mineral is tincal.

7. Process as defined in claim 6 wherein
said step (1) of treating the finely ground mineral with carbonic anhydride and ammonia comprises: adding the finely ground tincal to an aqueous medium; passing the resulting mixture through a decanter-washer and then through an absorber; supplying the absorber with ammonia and carbonic anhydride derived from a subsequent stage in the process in order to produce a carboammoniacal solution of tincal; then introducing that solution into a carbonation column and there subjecting it to the action of a gas rich in carbonic anhydride in order to precpitate sodium bicarbonate; separating the sodium bicarbonate and cooling te remaining mother liquor;

said step (5) of cooling the mother liquor separated from the precipated sodium bicarbonate is carried out to obtain crystals of ammonium biborate;

said step (8) of conveying the ammonia formed during said step (6) of applying heat to the solution of ammonium borate is carried out to convey the ammonia to the absorber;

said step (5) of redissolving the crystals of ammonium borate includes adding to the crystals the mother liquor recovered from said step (7) of separating crystallized boric from boric acid solution; and said process further comprises evaporating the remaining mother liquor of said step of separating the crystals of ammonium biborate in order to recover ammonia and carbonic anhydride; delivering that ammonia and carbonic anhydride to the absorber, and using the residual solution in said step of adding the tincal to an aqueous medium.

8. Process as defined in claim 7 wherein said step of cooling is carried out to maintain the temperature at the lower part of the column at about 50° C.

9. Process as defined in claim 6 comprising the preliminary steps of: dissolving the tincal in water; passing the solution through a decanter-washer; then cooling the solution to crystallize a pure hydrated sodium borate; using the remaining mother liquor to dissolve further quantities of tincal; and using the hydrated sodium borate as the borosodium mineral.

10. Process as defined in claim 9 wherein said step of treating comprises introducing the hydrated sodium borate crystals into a carbonation column, delivering to the carbonation column a carboammoniacal solution derived from a subsequent process stage and a gas rich in carbonic ahydride to precipitate the sodium bicarbonate; said step of separating the precipitated sodium bicarbonate includes enriching the mother liquor with recuperated ammonia; crystals obtained by said step of cooling to obtain crystals are of ammonium biborate; said step of conveying the ammonia includes recycling one part of the ammonia for use in said enriching step and another part of the ammonia to an absorber; and further comprising delivering to the absorber the mother liquor remaining after said step of cooling to obtain ammonium biborate crystals, to produce, at the absorber output a carboammoniacal solution which serves as the carboammoniacal solution delivered to the carbonation column.

11. Process as defined in claim 10 wherein the lower portion of the carbonation column is maintained at about 50° C.

12. Process as defined in claim 9 wherein said preliminary steps are carried out in a manner such that the hydrated sodium borate is pentahydrated sodium biborate.

* * * * *